United States Patent [19]
Brost et al.

[11] Patent Number: 5,546,314
[45] Date of Patent: Aug. 13, 1996

[54] PROCESSOR AND METHOD FOR DEVELOPING A SET OF ADMISSIBLE FIXTURE DESIGNS FOR A WORKPIECE

[76] Inventors: Randolph C. Brost, 4204 Landau NE, Albuquerque, N.M. 87111; Kenneth Y. Goldberg, 1006 W. Edgeware Rd., Los Angeles, Calif. 90026; Aaron S. Wallack, 244 Wilson Way, Albany, Calif. 94710; John Canny, Computer Science Division, 529 Soda Hall, Berkeley, Calif. 94720-1776

[21] Appl. No.: 466,112

[22] Filed: Jun. 6, 1995

Related U.S. Application Data

[63] Continuation of Ser. No. 239,382, May 6, 1994, abandoned.
[51] Int. Cl.$^6$ .................................................. G06F 19/00
[52] U.S. Cl. ........................... 364/474.01; 364/474.24; 364/512
[58] Field of Search ............... 364/468, 474.01–474.37, 364/512; 269/257, 261, 265, 900, 271–284, 21; 29/559, 712, 430, 466; 395/100, 161

[56] References Cited

U.S. PATENT DOCUMENTS

| | | | |
|---|---|---|---|
| 4,519,592 | 5/1985 | Russell | 269/261 |
| 4,640,501 | 2/1987 | Poland | 269/21 |
| 4,794,687 | 1/1989 | Peters et al. | 29/559 |
| 4,901,990 | 2/1990 | Frechette | 269/900 |
| 5,239,739 | 8/1993 | Akeel et al. | 29/430 |
| 5,278,953 | 1/1994 | Saxon et al. | 395/161 |
| 5,343,611 | 9/1994 | Lager et al. | 29/559 |

OTHER PUBLICATIONS

Kyoung Hung Kim "A System For Automated Fixture Planning with Modular Fixtures" May 1993, pp. 1–149.
Hazen et al. "Workholding automation: innovation in analysis, design, and Planning", Manufacturing Review vol. 3, No. 4, Dec. 1990, pp. 224–237.

Primary Examiner—Roy N. Envall, Jr.
Assistant Examiner—Steven R. Garland

[57] ABSTRACT

A fixture process and method is provided for developing a complete set of all admissible fixture designs for a workpiece which prevents the workpiece from translating or rotating. The fixture processor generates the set of all admissible designs based on geometric access constraints and expected applied forces on the workpiece. For instance, the fixture processor may generate a set of admissible fixture designs for first, second and third locators placed in an array of holes on a fixture plate and a translating clamp attached to the fixture plate for contacting the workpiece. In another instance, a fixture vice is used in which first, second, third and fourth locators are used and first and second fixture jaws are tightened to secure the workpiece. The fixture process also ranks the set of admissible fixture designs according to a predetermined quality metric so that the optimal fixture design for the desired purpose may be identified from the set of all admissible fixture designs.

42 Claims, 11 Drawing Sheets

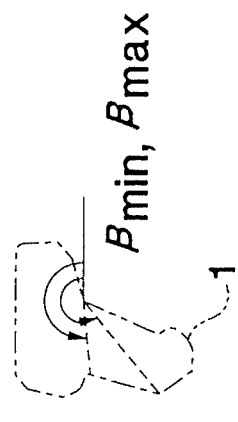
FIG. 6c
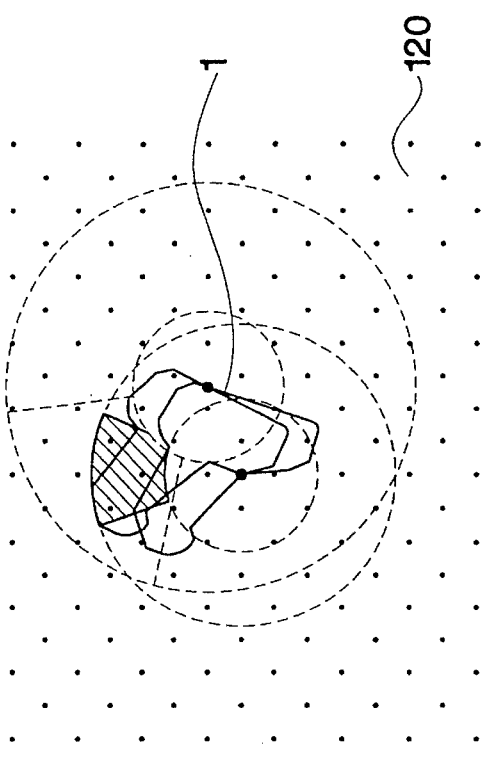
FIG. 6b
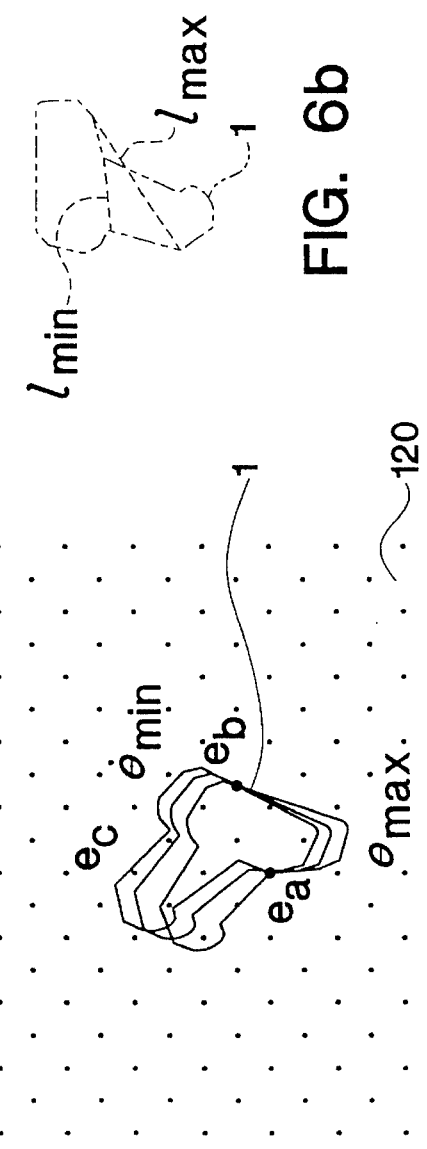
FIG. 6a
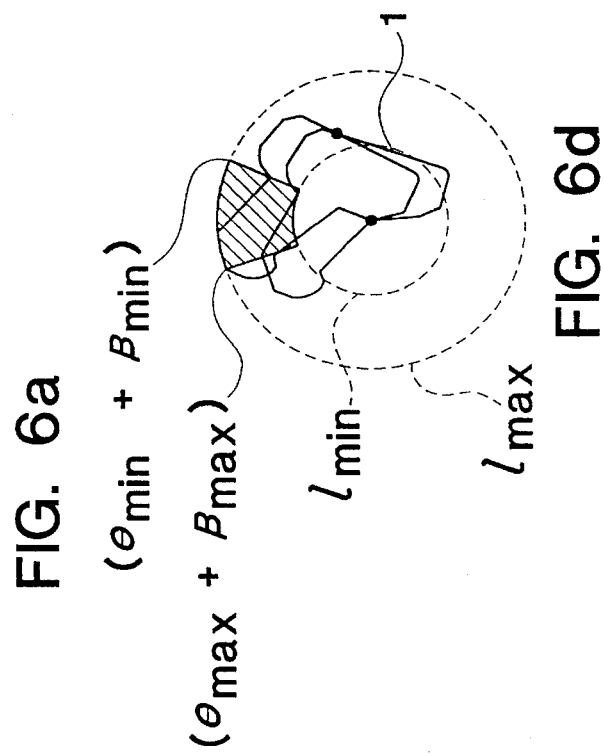
FIG. 6e
FIG. 6d

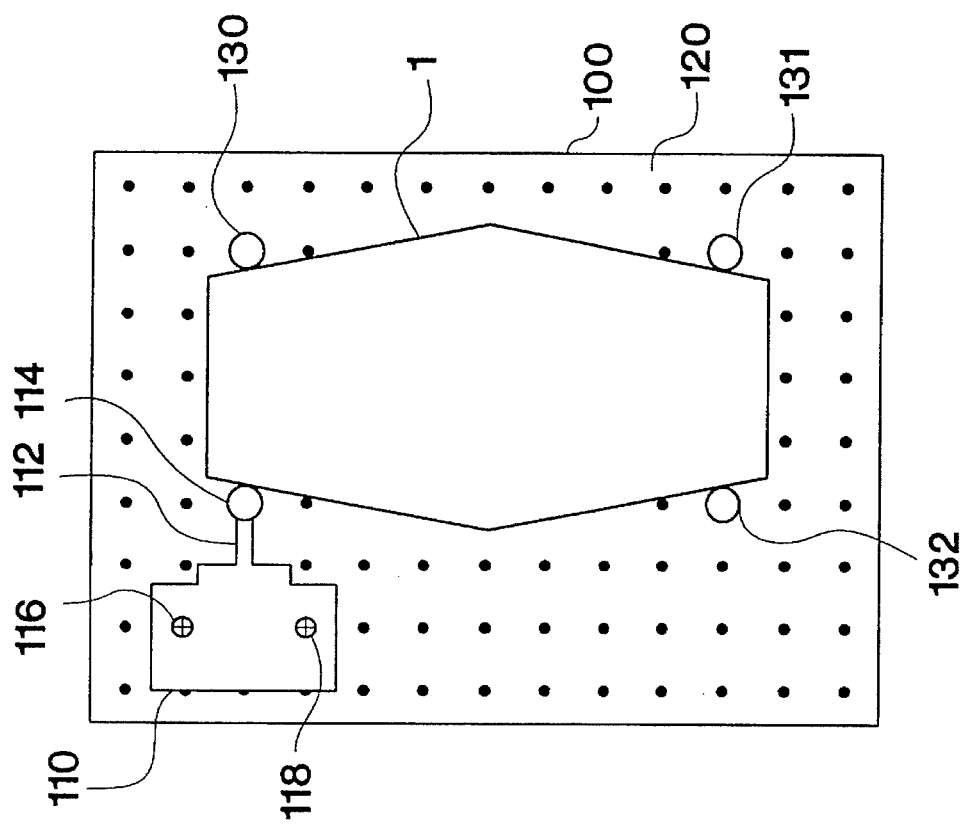
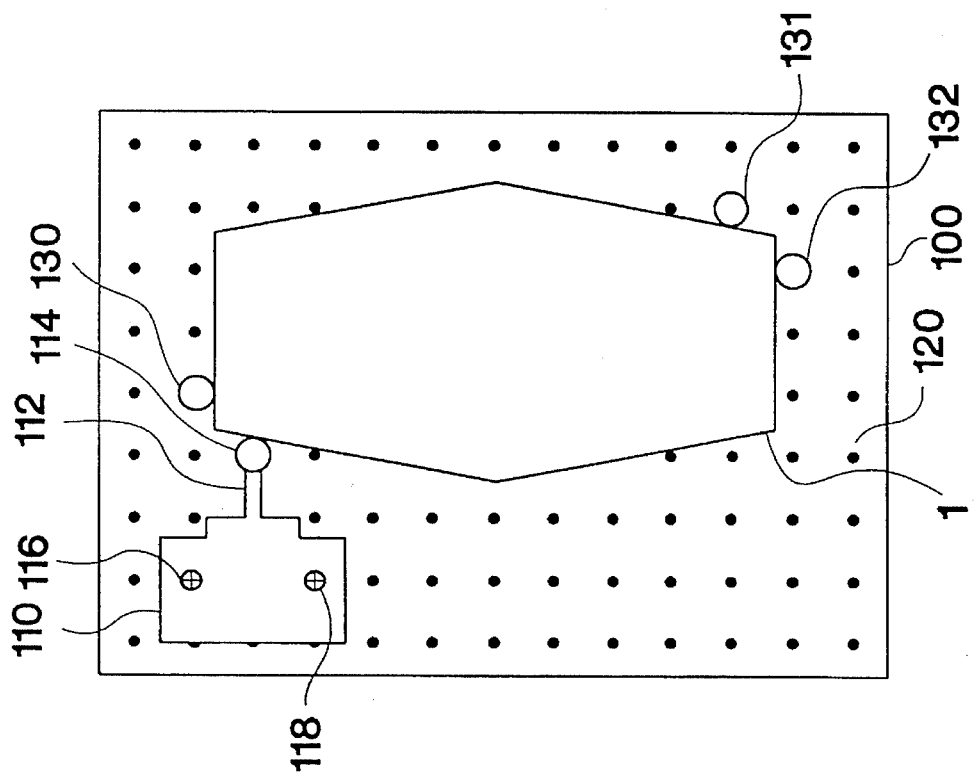
FIG. 11b
FIG. 11a

FIG. 12
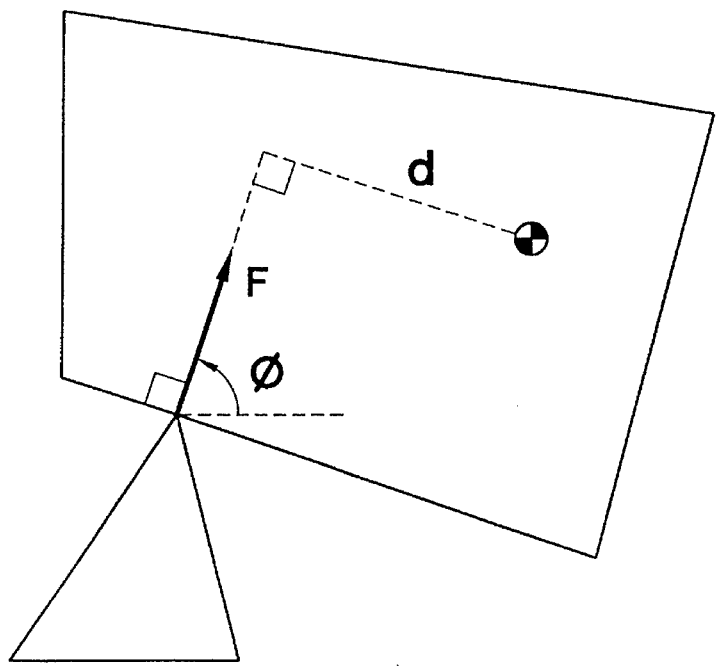
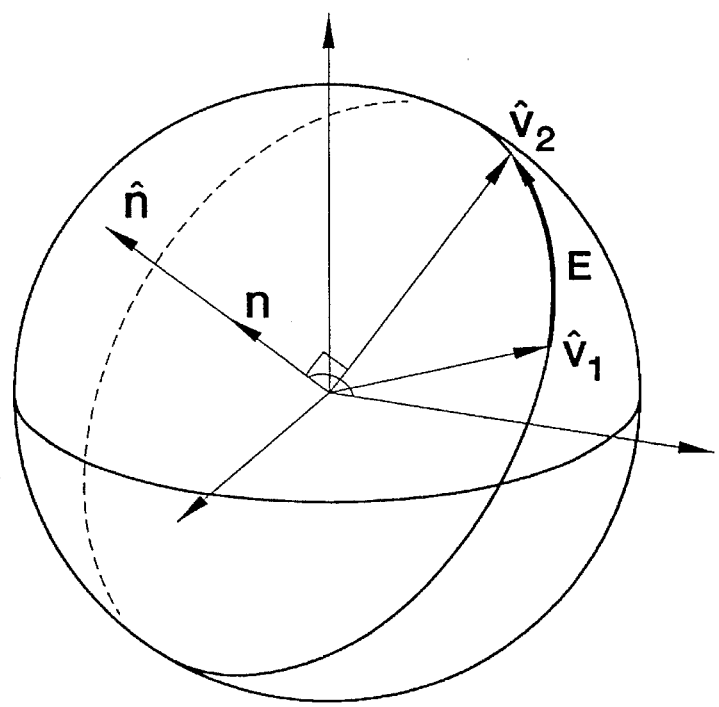
FIG. 13

5,546,314

PROCESSOR AND METHOD FOR DEVELOPING A SET OF ADMISSIBLE FIXTURE DESIGNS FOR A WORKPIECE

This invention was made, in part, with Government support under Contract DE-AC04-94AL85000, awarded by the U.S. Department of Energy. The Government has certain rights in this invention.

This application is a continuation of application Ser. No. 08/239,382, filed on May 6, 1994, now abandoned.

BACKGROUND OF THE INVENTION

1. Technical Field of the Invention

The present invention is directed to processors and methods for developing a set of modular fixture designs for a workpiece and, more particularly, the present invention is directed to developing the set of all admissible fixture designs that exists and finding the optimal fixture design based on a user defined quality metric.

2. Description of the Related Art

Currently, for automated manufacturing assembly and inspection operations, which require fixtures to locate and hold workpieces, design fixtures for the shape, position and orientation of the workpiece are generally custom designed by manufacturing engineers and machinists. Presently, general guidelines, such as the 3-2-1 rule, are used and processes for automatically developing design fixtures based on CAD workpiece models are still lacking. The absence of automated design fixture systems is largely due to the large amount of alternative fixture designs that must be considered in most cases. Modular fixture systems are known that typically include a square lattice of tapped and dowel holes with spacings toleranced to ±0.002 inches and an assortment of precision locating and clamping elements that can be rigidly attached to the lattice using dowel pins or expanding mandrels. Such modular fixture systems greatly reduce the number of alternatives but human intuition and trial and error techniques are still necessary to design the modular fixture. Furthermore, in the present modular fixturing systems, an acceptable design may not be found or a suboptimal fixture design may be used because a complete set of all admissible fixture designs are not systematically considered.

Known processes find a set of four (seven) independent regions on the boundary of a polygon (polyhedron) such that a frictionless contact applied to each region is guaranteed to provide form closure, which is a kinematic constraint condition that prevents motion of the workpiece. The set of four or seven independent regions are useful because of uncertainties in the pose of the workpiece before grasping is allowed. It is also known that comparable regions on a polygon can be found by using linear optimization with three frictional contacts in the plane. Also, processing for reorienting a polygon through a series of form posture grasping operations is known.

Further methods for analyzing the performance of a given fixture have also been analyzed. An Automatically Reconfigurable Fixture (ARF) system automatically synthesizes and constructs work holdings consisting of modular fixtures and determines whether a given fixture and design provides total constraint of a rigid body as well as loading accessibility before clamping. However, the ARF system fails to consider geometric access constraints in addition to kinematic closure.

A method of evaluating the degree of motion constraint imposed by seven fixels (fixture elements which refer to either a locator or a clamp on a fixture plane) contacting a three dimensional rigid body is also known. In this method, an extension of screw theory is applied based on motion stops for producing a metric estimate of the quality of the kinematic constraint of a given fixture design. However, a quality metric based on a user specified set of expected applied forces is not provided by this method.

It is desired to provide an automatic fixture design system which explicitly considers the entire process plan as well as non-geometric effects such as part deformation, tolerances, the release of internal stress during machining and the ability to flush away chips during cutting for example. The present invention is directed to providing a complete system and method that develops all admissible design fixtures so that the fixture design best satisfying the kinematic closure and geometric access constraints may be selected.

SUMMARY OF THE INVENTION

One object of the present invention is directed to providing systems and methods for automatically generating all of the admissible fixture designs for a desired workpiece if any exists.

A further object of the present invention is directed to a system and method which develops the optimal fixture from the set of admissible fixture designs developed based on geometric access constraints A further object of the present invention is directed to a system and method which develops the optimal fixture from the set of admissible fixture designs developed based on geometric access constraints and expected applied forces on the workpiece.

A further object of the present invention is to provide a system and method which ranks all of the admissible design fixtures based on a predetermined quality metric.

The objects of the present invention are fulfilled by providing a modular fixturing system comprising a fixture plate including in array of holes separated by a predetermined spacing for placing first, second and third locators thereon, a translating clamp attached to the fixture plate for contacting a workpiece between the first, second and third locators and the translating clamp, and a fixture processor for generating a set of admissible fixture designs which provide form closure based on geometric access constraints of the workpiece.

The fixture processor of the modular fixturing system further comprises input means for inputting a geometric representation of the workpiece, triplet determining means for generating sets of the array of holes on the fixture plate of the first, second and third locators, clamp enumerating means for generating positions of the translating clamp on the fixture plate, corresponding to the sets of the array of holes which provide form closure within the geometric access constraints for the workpiece, and fixture filtering means for checking clamp locations and clamp travel limits of the translating clamp and determining whether each of the sets of the array of holes and the corresponding positions of the translating clamp will fit on the fixture plate for obtaining the set of admissible fixture designs. The fixture processor further comprises ranking means for ranking the set of admissible fixture designs according to a predetermined quality metric for the workpiece which allows the set of admissible fixture designs to be ranked by estimating a maximum contact reaction force required to resist the expected applied forces. The fixture processor further comprises mapping means for mapping the set of admissible fixture designs onto the fixture plate.

The objects of the present invention are also fulfilled by providing a modular fixture design processor for developing a set of admissible fixture designs on a fixture plate where a workpiece with first, second and third locators and a translating clamp, comprising input means for inputting a geometric representation of the workpiece, and a fixture processor for generating a set of admissible fixture designs for the geometric representation of the workpiece based on geometric access constraints of the workpiece.

The modular fixture design processor develops the set of admissible fixture designs for a desired type of fixture. The desired type of fixture comprises form closure, force closure, simple locating and redundantly constrained. Each type of these fixtures has an associated number of contact points and force opposition requirements. For example, the form closure fixture resists all applied disturbances without relying on friction, the force closure fixture relies on friction to resist some disturbance forces, the simple locating fixture resists a limited set of disturbance forces but not necessarily all applied disturbances, and the redundantly constrained fixture contains extra supports and clamps to prevent deformation of the part under the application of large forces.

The objects of the present invention are further fulfilled by providing a method for developing a set of admissible fixture designs on a fixture plate for a workpiece with first, second and third locators and a translating clamp, comprising the steps of inputting a geometric representation of the workpiece, and generating the set of admissible fixture designs for the geometric representation of the workpiece which provides form closure based on geometric access constraints of the workpiece.

The objects of the present invention are also fulfilled by providing a method for developing a set of admissible fixture designs on a fixture plate for a workpiece for first, second and third locators and a translating clamp, comprising the steps of inputting a geometric representation of the workpiece, generating sets of the first, second and third locators on the fixture plate for the workpiece, generating positions for the translating clamp on the fixture plate corresponding to the sets of the first, second and third locators which provide form closure based on geometric access constraints of the fixture plate, checking clamp locations and clamp travel limits of the translating clamp, and determining whether the sets of the first, second and third locators and the corresponding positions of the translating clamp will fit on the fixture plate for obtaining the set of admissible fixture designs.

The objects of the present invention are further achieved by providing a modular fixture system comprising a fixture table; first and second fixture jaws disposed on said fixture table capable of being translated in a planar direction along the top surface of said fixture table and being immobilized at a desired position, said first and second fixture jaws including an array of holes separated by a predetermined distance for placing first, second, third and fourth locators therein which contact a workpiece; and a fixture processor for generating a set of admissible fixture designs which provide form closure based on geometric access constraints of said workpiece.

The objects of the present invention are further achieved by a method for developing a set of admissible fixture designs on a fixture table for a workpiece with first and second fixture jaws disposed on said fixture table capable of being translated in a planar direction along the top surface of said fixture table and being immobilized at a desired position, said first and second fixture jaws including an array of holes separated by a predetermined distance for placing first, second, third and fourth locators therein which contact said workpiece, comprising the steps of:

(a) inputting a geometric representation of the workpiece;

(b) generating sets of the first, second and third locators on said first fixture jaw for the workpiece; and (c) generating positions of the fourth locator on said second fixture jaw corresponding to said sets of the first, second and third locators which provide form closure based on geometric access constraints of the workpiece on the fixture table.

The system, processor and method for the embodiments of the present invention are able to find an admissible fixture design if one exists by completely and systematically analyzing the complete set of admissible fixture designs. Thereby, the use of a sub-optimal fixture design may be avoided and the optimal fixture design according to a predetermined quality metric will be achieved.

Further scope of applicability of the present invention will become apparent from the detailed description given hereinafter. However, it should be understood that the detailed description and specific examples, while indicating preferred embodiments of the invention, are given by way of illustration only, since various changes in modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIGS. 6(a), 6(b), 6(c), 6(d) and 6(e) illustrate the process for determining candidate locations for a third fixel of a workpiece;

FIGS. 11(a) and 11(b) illustrate two different fixture designs that provide form closure for ranking comparison;

FIG. 12 illustrates parameters used in mapping a contact normal ray;

FIG. 13 illustrates the construction of edges which connects pairs of force-sphere points.

PREFERRED EMBODIMENTS OF THE PRESENT INVENTION

Figure 1:
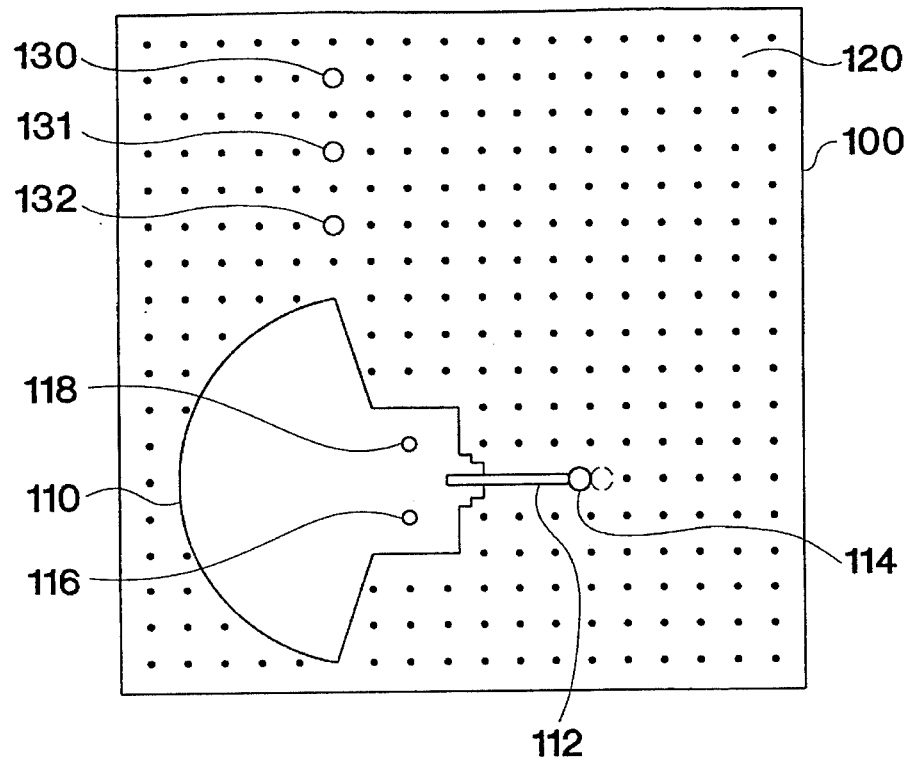
FIG. 1 illustrates a fixture plate system for one embodiment of the present invention.
Figure 2:
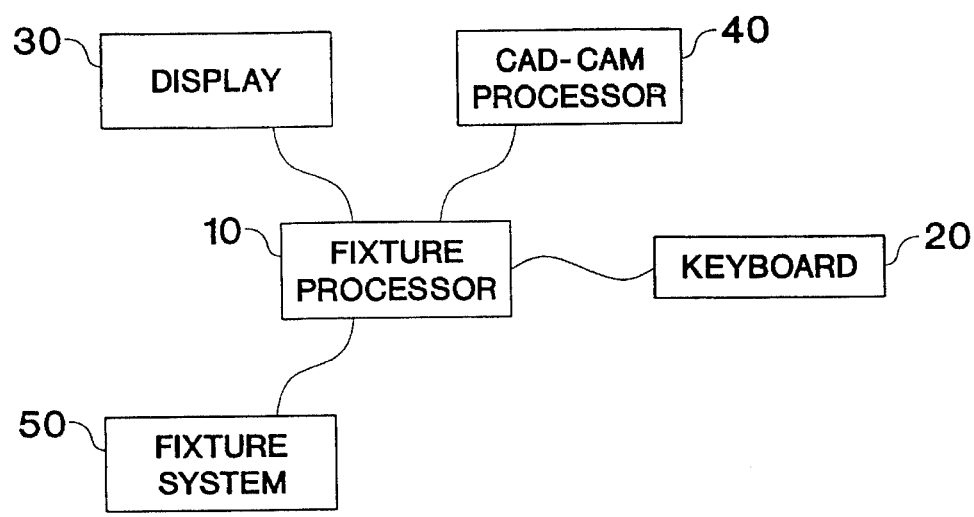
FIG. 2 illustrates a block diagram for the system in an embodiment of the present invention.

The first embodiment of the present invention will be discussed with references to FIGS. 1 through 3. FIG. 1 illustrates a fixture plate 100 including an array of precisely machined alternating dowel/threaded holes 120, a set of three round locators 130, 131 and 132 and a manually actuated translating clamp 110. The translating clamp 110 includes a clamp plunger 112 having a cylindrical clamp tip 114 and unit spaced connectors 116 and 118. As illustrated in FIG. 2, the modular fixturing system for the first embodiment of the present invention includes a fixture processor 10 for developing a set of admissible fixture designs for a workpiece, a keyboard 20 for inputting information to the fixture processor 10, such as the geometric representation of the workpiece, geometric access constraints and expected applied forces on the workpiece, etc., a display 30 which displays the admissible fixture designs developed by the fixture processor 10 along with the necessary information input thereto, a CAD-CAM processor 40 for inputting information such as geometric access constraints and expected applied forces based on an algorithm and a fixture system 50 which may be positioned responsive to the fixture processor 10. In one example of the present embodiment, a Symbolic XL-1201 Lisp machine is used for the fixture processor 10, the keyboard 20 and the display 30.

Before discussing the processing performed by the fixture processor 10, background information and terms will be discussed in order to insure an understanding of the processing.

The fixture designs prevent a workpiece from translating and rotating on the fixture plane by providing four contacts with the edges of the projected boundary of the workpiece. The four contacts are provided by the three round locators 130, 131 and 132 and translating clamp 110. The three round locators 130, 131, and 132 are each centered on one of the array holes 120. One of the array holes 120 and the translating clamp 110 that is attached to the fixture plate by a pair of unit spaced connectors 116 and 118 through two of the array holes 120 allows contact at a variable distance along the principal axes of the fixture plate. The term "fixel" (fixture element) is used to refer to either one of the locators 130, 131 and 132 or the translating clamp 110 and the term "fixture" is used to refer to a geometric arrangement of the three locators 130, 131 and 132 and the translating clamp 110 on the fixture plate 100.

An acceptable fixture design must satisfy several requirements. First, the fixture design must fully constrain the part to prevent any motion. Since kinematic constraints may reliably resist arbitrarily applied forces, fixtures are required to provide form closure which is a kinematic constraint condition that prevents all motion. In addition to constraining the part, the fixture must not interfere with certain geometric regions due to cosmetic surfaces by the need to retain clearance for grasping, machining, assembly or other operations on the workpiece. Thereby, geometric access constraints define regions of points that must remain free of fixture components. Accordingly, a fixture is admissible if form closure is provided and the geometric access constraints are provided.

The set of admissible fixture designs may be constructed by first characterizing the type of fixture desired. The type of desired fixtures include either form closure, force closure, simply locating, or redundantly constrained. Each type of fixture has an associated number of contact points and force opposition requirements. For example, the form closure fixture can resist all applied disturbances without relying on friction. The force closure fixture may rely on friction to resist some disturbance forces. The simple locating fixture is able to resist a limited set of disturbance forces but may not necessarily resist all applied disturbances. The redundantly constrained fixture obtains extra supports and clamps to prevent deformation of the workpiece under the application of large forces. Upon specifying the type of desired fixture design, the fixture processor 10 generates all of the admissible fixtures within the class of fixtures.

Figure 3:
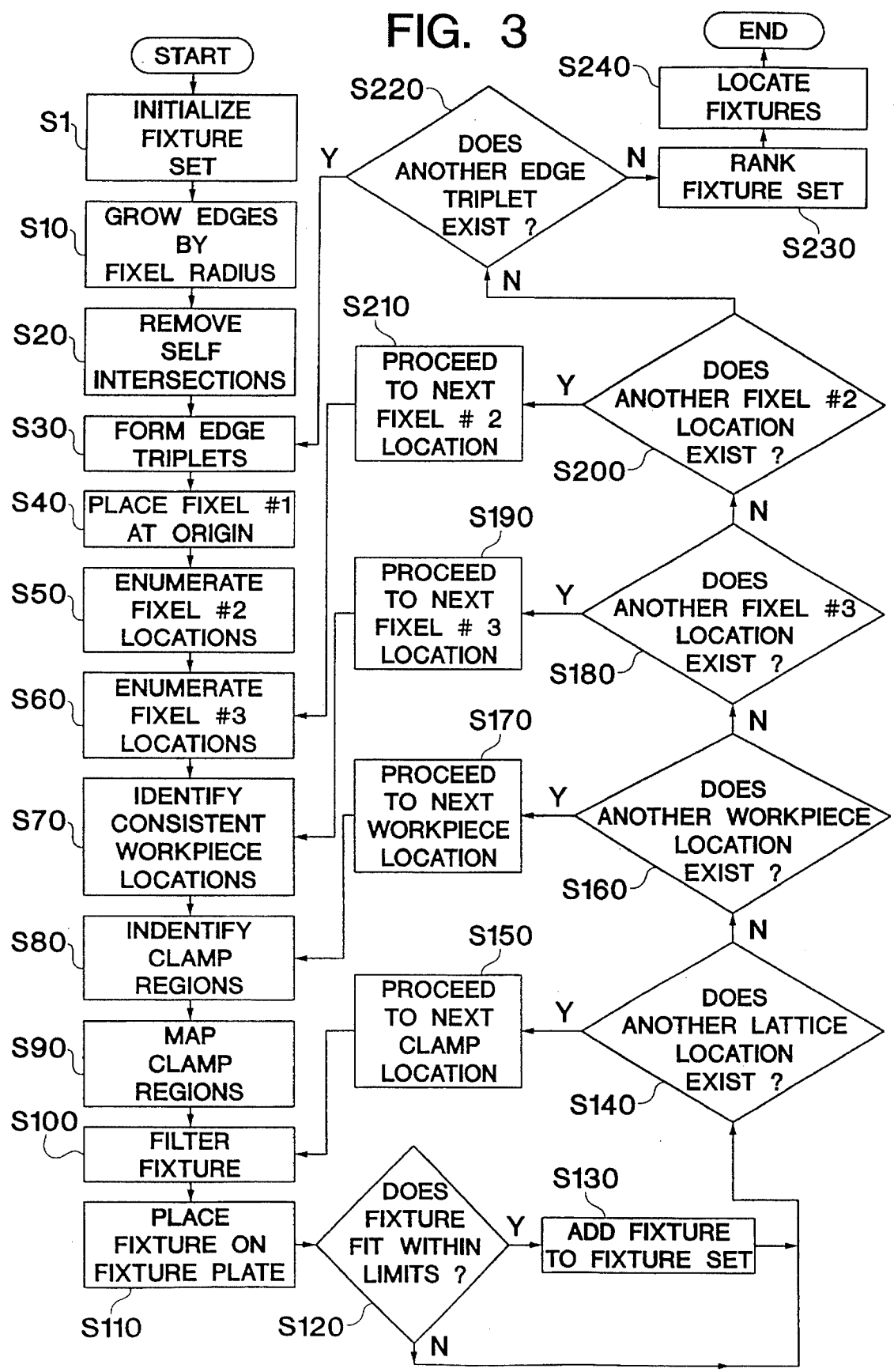
FIG. 3 illustrates a flow chart for the fixture processor in an embodiment of the present invention.

A general description for the process performed by the fixture processor 10 will be provided before specifically discussing the process illustrated in the flow chart of FIG. 3. The process begins with a geometric formation that expands the projected workpiece boundary by the radius of the locators 130, 131 and 132 for allowing the locators 130, 131, and 132 to be treated as points on the transformed edges. The edges are then trimmed to respect geometric access constraints. Next, all locator set-ups that are possible for the transformed edges are enumerated. A locator set-up is defined by three locator positions and an $(x, y, \Theta)$ configuration where the workpiece contacts all three locators 130, 131 and 132. There are a finite number of possible locator set-ups and each of these set-ups is passed to a form closure analysis.

For each locator set-up, the form closure analysis characterizes the motion constraints imposed by the locator set-up and then identifies the set of all points along the perimeter of the workpiece where an additional contact would provide total constraint. As a result, all of the possible form closure clamp locations for each locator set-up identified and each corresponding clamp location defines a unique fixture design. After filtering this set of possible fixture designs by checking for geometric violations such as the translating clamp 110 intersecting the workpiece or other fixels, the remaining fixture designs are ranked based on a scalar metric such as the ability to resist an applied force without exerting large contact reaction forces. This process only generates design fixtures for each fixel contacting the interior of at most one edge of the workpiece. Thereby, design fixtures where a fixel contacts a part vertex or multiple part edges are neglected. All design fixtures that can be mapped onto each other through translation or rotation are treated as equivalent and only one design fixture is generated from each equivalence class.

With reference to FIG. 3, the fixture set is initialized at Step S1. Input to the fixture processor 10 are a polygonal part boundary provided as a list of vertices, a set of geometric access constraints provided as a list of polygons defined in the part coordinate frame, height and width of the fixture plate 100, the spacing between the array of holes 120, the radius of the locators 130, 131 and 132, a description of the translating clamp 110 including a polygonal shape for the workpiece, locations of the unit spaced connectors 116 and 118, a polygon describing the shape of the clamp plunger 112 and the minimum and maximum travel limits of the clamp plunger 112 with the clamp tip 114 assumed to be a circle having the same radius as the locators 130, 131 and 132 and a quality metric that is a function accepting a fixture design for returning a scalar quality measure. The geometric access constraints and expected applied forces may be generated either manually or by the CAD-CAM processor 40.

Next, at Step S10, edges are grown by the fixel radius and edges are trimmed to remove self intersections at Step S20. By expanding the polygonal part boundary by the radius of the locators, the locators may be treated as ideal points. Fixturing the expanded boundary with ideal points is then equivalent to fixturing the original part boundary with finite radius locators. Points on the edges of the expanded boundary may be considered as candidate positions for locators. Although the expanded boundary has rounded edges corresponding to contacts between a locator and an object vertex, only the linear edges of the expanded boundary are considered. Similarly, the constraint regions are grown by their fixel radius and then the sub-set of the expanded part edges which do not intersect the grown constraints are considered so that the fixels of all generated fixtures will avoid the access constraint regions.

After the transformation so that the locators can be treated as points, all possible fixtures are enumerated. At Step S30, a set of all edge triplets are numerated. Each combination of a locator triplet and an (x, y, $\Theta$) configuration specifies a locator set-up. To enumerate all locator triplets, the following steps are repeated for all combinations of three edges where either all of the three edges differ or two of the three edges are identical. For example, assume that ($e_1$, $e_5$, $e_2$) and ($e_4$, $e_7$, $e_4$) are both valid edge combinations. Because the order is not significant, there are $$\binom{n}{3} + n \cdot (n-1)$$

such combinations for n edge segments.

Figure 5A:
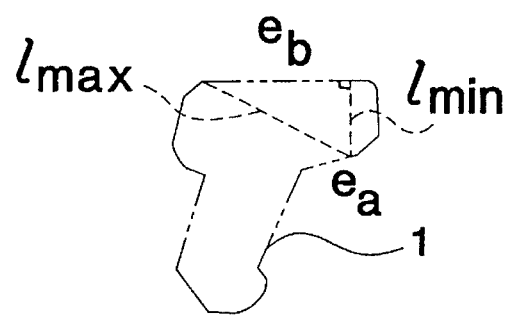
FIGS. 5(a), 5(b) and 5(c) illustrate the process for determining candidate locations for a second fixel location for a workpiece.
Figure 5B:
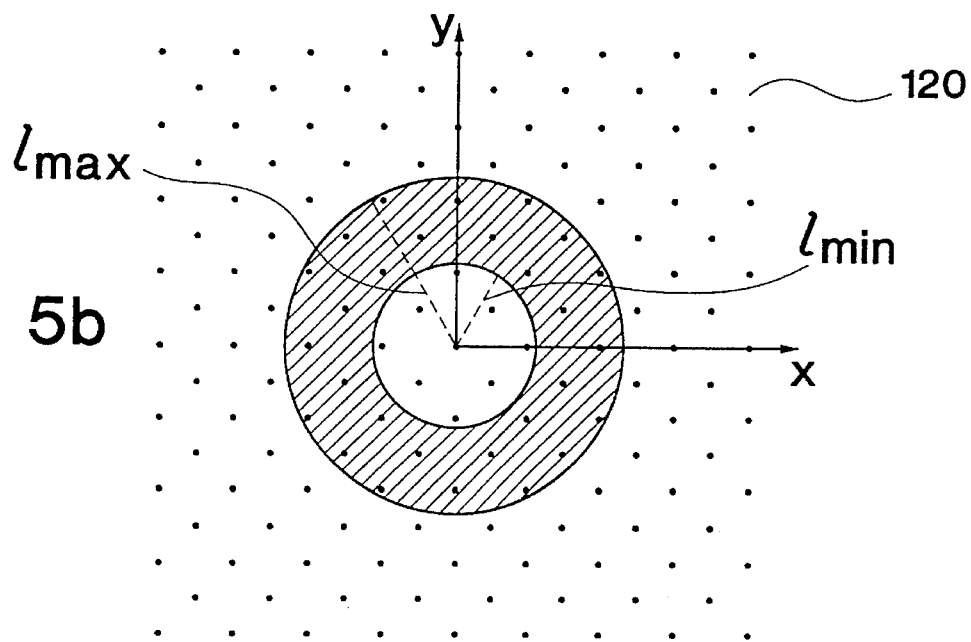
Figure 5C:
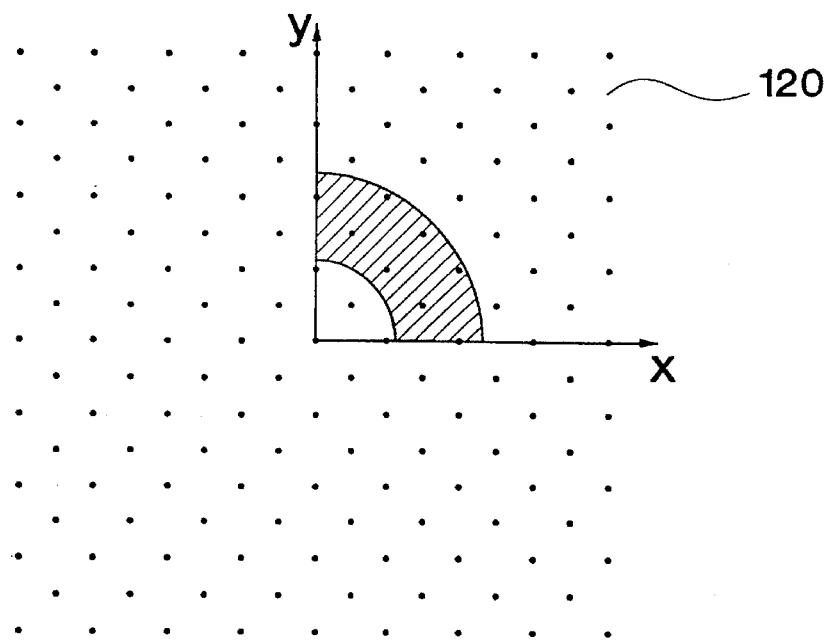

It is noted that because a workpiece with three locators on one edge cannot be held in form closure, combinations with three identical edges do not need to be considered. In a combination of three edges ($e_a$, $e_b$, $e_c$) it can be assumed without any loss in generality that $e_a$ makes contact with a locator at the origin of the array of holes 120. With reference to 5(a) through 5(c), by translating $e_a$ about the origin, $e_b$ sweeps out an annulus centered on the origin with an inner diameter equal to the minimum distance $1_{min}$ between $e_a$ and $e_b$ and an outer diameter equal to the maximum distance $1_{max}$ between $e_a$ and $e_b$. In other words, for any orientation of $e_a$, a translation is made along the extend of $e_a$ with $e_b$ sweeping out a parallelogram. The union of these parallelograms as $e_a$ is rotated forms an annulus. To eliminate equivalent fixtures, only the first quadrant of the annulus formed in FIG. 5(b) is considered as illustrated in FIG. 5(c). In Step S40, the first fixel is placed at the origin for one of the edge triplets. Thereby, the second fixel locations are enumerated corresponding to the first fixel location at Step S50.

After identifying each of the second fixel locations, all possible locations for the third fixel are identified at Step S60. If the first locator contacts $e_a$ and the second locator contacts $e_b$, then a third locator in contact with $e_c$ must be pairwise consistent with both $e_a$ and $e_b$. The exact regions swept out by $e_c$ while maintaining contact with the first two fixels $e_a$ and $e_b$ is difficult to characterize. However, an envelope that contains this region is easily found by independently considering each pair of $e_a$ and $e_b$. The possible locations for $e_c$ with respect to $e_a$ for an annulus around the origin and the possible locations for $e_c$ with respect to $e_b$ form an annulus around the second locator. An intersection of these annuli provides a conservative bound on the set of array locations that simultaneously satisfy both constraints as illustrated in FIGS. 6(a) through 6(e).

This bound may be further refined by considering the angular limits for each annulus. By first identifying the angular limits of the part configurations that simultaneously contact the first and second locators, an [$\Theta_{min}$, $\Theta_{max}$] interval of reachable part angles is produced. Then, this interval is transformed by adding an [$\beta_{min}$, $\beta_{max}$] interval that delineates the minimum and maximum angles obtainable by a ray connecting $e_a$ and $e_c$. The resulting [($\Theta_{min}$+$\beta_{min}$), ($\Theta_{max}$+$\beta_{max}$)] interval describes a set of all possible angles between points on the $e_a$ and $e_c$ edge while $e_a$ and $e_b$ maintain contact with the first and second locators. This interval defines a sector of the $e_a e_c$ annulus with points outside of this section being unreachable by $e_c$. A similar construction provides a sector of the $e_b e_c$ annulus based on the $\beta$-interval corresponding to edges $e_b$ and $e_c$. The intersection of these annular sections provides a set of candidate locations for the third locator as illustrated in FIG. 6(e).

For each triplet of locators and associated contact edges, a set of consistent workpiece locations using c-equations are identified at Step S70. This is accomplished by a configuration space analysis that constructs the intersection points of edge/vertex-edge/vertex (ev-ev) contact equations. This calculation identifies intersection points between the ev-ev edges on the configuration-space obstacle corresponding to two-point contact situations. For example, if $e_a$, $e_b$ and $e_c$ are the edges of the workpiece in contact with fixels $v_1$, $v_2$ and $v_3$ respectively, then the combinations $e_a v_1$-$e_b v_2$, $e_a v_1$-$e_c v_3$, and $e_b v_2$-$e_c v_3$ all correspond to two contact situations that have an associated one dimensional locus of points in the (x, y, $\Theta$) configuration space. A three point contact is only possible at the intersections of these loci so that the set of part configurations where all three fixels are in contact may be found by solving further roots of the parametric equations describing these intersections.

The set of configurations that contain a single ev contact has two degrees of freedom which correspond to rotating the polygon or sliding the polygon laterally while maintaining the contact. By neglecting the edge and points and assuming a point fixel, the set of configurations corresponds to an unbounded surface that forms a helicoid in the (x, y, $\Theta$) configuration space. Because the polygon edge is not infinitely long, there are local applicability constraints that delimit the reachable sub-set of the infinite surface. The intersection of two such surfaces forms a one dimensional locus of points which may occur in two forms depending upon the geometry of the corresponding polygon edges. If the polygon edges are parallel, then the surfaces will intersect in zero, one or two infinite lines which are parallel to the xy plane. If the polygon edges are not parallel, then the surfaces will intersect along a curve that is unbounded in the sense that it is continuous over the interval $\Theta \in [0, 2\pi]$ and connected at $\Theta=0=2\pi$. These are referred to as parallel and non-parallel cases respectively and the one dimensional locus is referred to as an ev-ev edge. In the generic case, the intersection of three ev c-surfaces will define a finite collection of points. These points will also correspond to the intersection of the ev-ev edges corresponding to each pair chosen from the three surfaces. As a result, these intersection points can be found by first performing two of the three ev-ev edges defined by the three c-surfaces and then the points where the ev-ev edges intersect are found.

Figure 14:
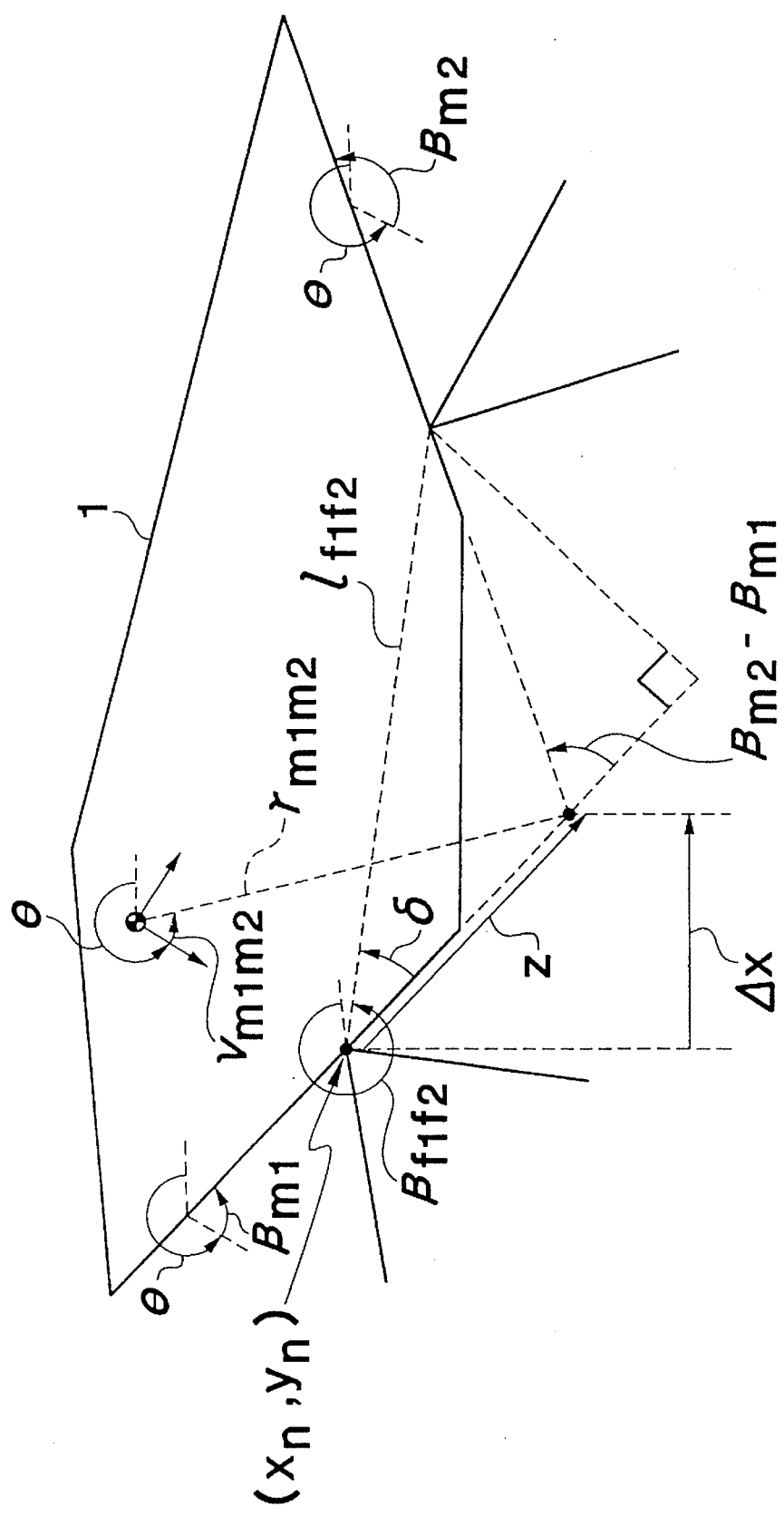
FIG. 14 illustrates the parameters used in deriving scalar functions $f_x(\Theta)$ and $f_y(\Theta)$.

The method of representing ev-ev edges and of computing the intersection points of two ev-ev edges will be discussed as follows: ev-ev edges may correspond to parallel or non-parallel cases. In the parallel case, the ev-ev edge corresponds to zero, one or two lines that are parallel to the xy-plane. These may be represented by xy line equations with an associated $\Theta$ value that describes the elevation of the line about the xy-plane. In the non-parallel case, the ev-ev edge corresponds to Q curve that is a function of $\Theta$ with this curve being represented by two scalar functions: $f_x(\Theta)$ and $f_y(\Theta)$ which correspond to the x and y components of the curve respectively. The following equations with respect to FIG. 14 show the derivation of these functions:

$$x = x_{fl} + \Delta x - r_{m1m2}c_{(\theta+v_{m1m2})}$$

$$x = x_{fl} + c_{(\theta+\beta_{m1})}z - r_{m1m2}c_{(\theta+v_{m1m2})}$$

$$x = x_{fl} + c_{(\theta+\beta_{m1})}\left[l_{fl2}c_\delta - \frac{l_{fl2}s_\delta}{\tan(\beta_{m2}-\beta_{m1})}\right] -$$
$$r_{m1m2}c_{(\theta+v_{m1m2})}$$

$$x = x_{fl} + c_{(\theta+\beta_{m1})}\left[l_{fl2}c_{(\beta_{fl2}-\theta-\beta_{m1})} - \frac{l_{fl2}s_{(\beta_{fl2}-\theta-\beta_{m1})}}{\tan(\beta_{m2}-\beta_{m1})}\right] -$$
$$r_{m1m2}c_{(\theta+v_{m1m2})}$$

$$f_x(\Theta) \leftarrow k_{0_x} + k_{1_x}s_\theta + k_{2_x}c_\theta + k_{3_x}c_\theta s_\theta + k_{4_x}s_\theta^2$$

where $$k_{0_x} = x_{fl} + l_{fl2}c_{\beta_{m1}}\left[c_{(\beta_{m1}-\beta_{fl2})} + \frac{s(\beta_{m1}-\beta_{fl2})}{\tan(\beta_{m2}-\beta_{m1})}\right]$$

$$k_{1_x} = y_{m1m2}$$

$$k_{2_x} = -x_{m1m2}$$

$$k_{3_x} = l_{fl2}\left[-s_{(2\beta_{m1}-\beta_{fl2})} + \frac{c_{(2\beta_{m1}-\beta_{fl2})}}{\tan(\beta_{m2}-\beta_{m1})}\right]$$

$$k_{4_x} = -l_{fl2}\left[c_{(2\beta_{m1}-\beta_{fl2})} + \frac{s_{(2\beta_{m1}-\beta_{fl2})}}{\tan(\beta_{m2}-\beta_{m1})}\right]$$

$$f_y(\Theta) \leftarrow k_{0_y} + k_{1_y}s_\theta + k_{2_y}c_\theta + k_{3_y}c_\theta s_\theta + k_{4_y}s_\theta^2$$

where $$k_{0_y} = y_{fl} + l_{fl2}s_{\beta_{m1}}\left[c_{(\beta_{m1}-\beta_{fl2})} + \frac{s(\beta_{m1}-\beta_{fl2})}{\tan(\beta_{m2}-\beta_{m1})}\right]$$

$$k_{1_y} = -x_{m1m2}$$

$$k_{2_y} = -y_{m1m2}$$

$$k_{3_y} = l_{fl2}\left[c_{(2\beta_{m1}-\beta_{fl2})} + \frac{s_{(2\beta_{m1}-\beta_{fl2})}}{\tan(\beta_{m2}-\beta_{m1})}\right]$$

$$k_{4_y} = l_{fl2}\left[-s_{(2\beta_{m1}-\beta_{fl2})} + \frac{c_{(2\beta_{m1}-\beta_{fl2})}}{\tan(\beta_{m2}-\beta_{m1})}\right]$$

Given a pair of ev-ev edges, there are three possible cases. The first is the parallel/parallel case. In this case, both ev-ev edges corresponds to the parallel case so all three polygon edges must be parallel. There are either zero or an infinite number of solutions and in either case no intersection points are returned. The second case is the parallel/non-parallel case. The parallel case ev-ev edge is defined by a collection of lines that lie on constant $\Theta$ planes. For each such line, $x=f_x(\Theta_{line})$ and $y=f_y(\Theta_{line})$ are computed and then a test is performed to determine whether the resulting (x,y) point lies on the line. The set of all resulting intersection points is returned because there are at most two lines and no more than two intersection points that may be returned. In the non-parallel/non-parallel case, ev-ev edges A and B are given and the points where A and B intersect will be defined by the $\Theta$ values which simultaneously satisfy the equations:

$$f_{xA}(\Theta)=f_{xB}(\Theta)$$

$$f_{xB}(\Theta)=f_{yB}(\Theta)$$

The $\Theta$ values are identified by finding the roots of the first equation rearranged to $f_{xA}(\Theta)-f_{xB}(\Theta)=0$ and then retaining all of the resulting $\Theta$ values that also satisfy the second equation. It is possible to construct closed form equations to solve for the required roots, but a numerical procedure is used instead for reasons based on numerical robustness. Regardless of the solution method, there may be zero, one or two consistent $\Theta$ values. These values are then supplied to the $f_{xA}(\Theta)$ and $f_{yA}(\Theta)$ functions to determine the corresponding x and y values. In certain non-generic situations, it is possible to have an infinite number of solutions which corresponds to the case where the two ev-ev edges are coincident. Each of the above cases has an associated method for recovering a set of configuration space points consistent with all three ev contacts. In generic cases, the set includes up to two discrete points. In non-generic cases, there may be an infinite set of consistent configurations but these nongeneric situations do not constrain the object to a unique location and they are discarded.

Figure 7A:
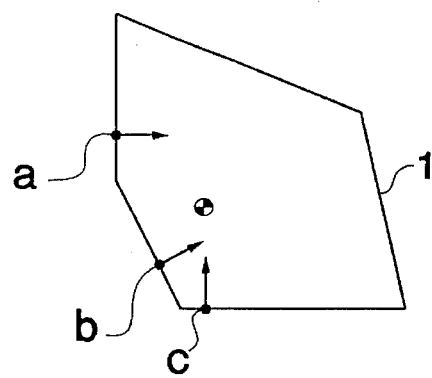
FIGS. 7(a) and 7(b) illustrate the mapping of a line of force onto a force sphere for generating a set of form closure clamp positions.
Figure 7B:
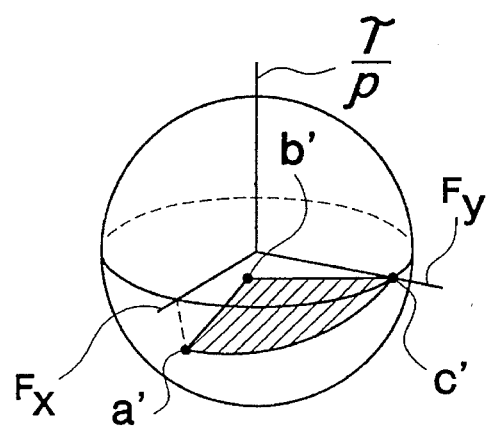

Next, all of the possible clamp positions that provide form closure are identified for the workpiece locations at Step S80. For each set-up, several candidate fixtures may be generated which each have a different clamp position. To generate the set of form closure clamp positions for a locator set-up, a constraint analysis is performed on the sphere and a unit sphere centered at the origin at the $(F_x, F_y, \tau/\rho)$ space of planar forces. This space represents both the direction and moment components of a line of force exerted in the plane as illustrated in FIG. 7(a) and 7(b) for example, where an example planar force F and its corresponding point on the force sphere is shown for the workpiece 1.

The equations describing this mapping will be described as follows with respect to the force sphere representation wherein only part of the capabilities are used. First, because contact friction is not considered, all contacts are analyzed as a single force corresponding to the contact normal. Second, because only conditions of pure kinematic closure are considered, a dynamic analysis or evaluation and the motions consistent with all possible contact modes are not performed. Thereby, the force sphere representation is quite simple where form closure is possible when the convex combination of the kinematic constraints expands the force sphere. By the duel nature of the force and motion wrenches, it is implied that motion cannot occur without violating at least one kinematic constraint. In order to construct the set of form closure fixtures that are possible for a given locator set-up, there are two key constructions used: the convex hull of the contact normals for the locator set-up and the "zig-zag" locus of all possible contact normals for the given workpiece. For each construction, a set of force space points is constructed that results from mapping particular contact normals onto the force sphere. The following equations are used with reference to FIG. 12:

$$F = \begin{bmatrix} \cos(\phi) \\ \sin(\phi) \\ -\dfrac{d}{\rho} \end{bmatrix}$$

$$\hat{F} = \frac{F}{|F|}$$

The first equation expresses the contact normal in the force space and the second equation projects the force onto the unit sphere by scaling the force to a unit magnitude. Because a dynamic motion analysis is not being performed, ρ may be any positive value.

This construction provides a method for mapping arbitrary contact normals onto the force sphere. To construct the convex hull of three contact normals or the zig-zag locus of all possible contact normals, edges connecting pairs of force sphere points are constructed. These edges are constructed using the cross product construction as illustrated in FIG. 13. In this construction a great circle arc connecting the vertices $\hat{v}_1$ and $\hat{v}_2$ is implicitly represented by the normalized cross product vector $\hat{n}$=normalized ($\hat{v}_1 \times \hat{v}_2$). The orientation of $\hat{n}$ may also be interpreted as a half-space constraint defining a hemispherical subset of the force sphere. To construct the convex hull of the contact normal for a locator set-up, each contact normal is first mapped onto the force sphere and then great circle edges are performed which connect all pairs of the three resulting points. Then, these edges are oriented so that the intersection of their corresponding half space constraints defines the interior of the convex hull. To construct the zig-zag locus of possible contact normals, each polygon edge e in turn is considered and the contact normal corresponding to each end point of e is then mapped onto the force sphere. The resulting pairs of force sphere points are connected for producing the vertical edges of the zig-zag locus. The diagonal edges may be constructed by connecting the points corresponding to contact normals on either side of each vertex. However, these diagonal edges are not analyzed because clamps are not permitted on a vertex in this process.

Figure 8A:
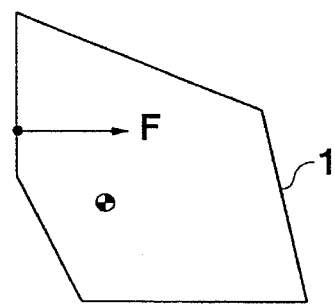
FIGS. 8(a) and 8(b) illustrate a set of points on a force sphere corresponding to three contact normals and a typical locator set-up.
Figure 8B:
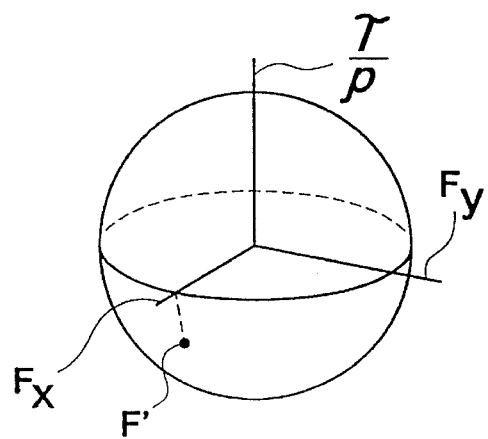

Each fixel/edge contact is treated as an ideal unilateral point constraint. Thereby each fixel may resist motion by exerting a reaction force in the direction of the inward pointing contact normal. The set of points on the force sphere corresponding to the three contact normals of a typical locator set-up is illustrated in FIGS. 8(a) and 8(b). The triangle on the force sphere in FIG. 8(b) delineates the set of all total contact reaction forces that may be produced by combining forces from all three contacts. A fixture design provides form closure exactly when the corresponding set of contact normals spans the entire force sphere. When this condition is satisfied, combinations of contact reaction forces may produce an arbitrary total reaction force which opposes an arbitrary motion. In other words, if the set of contact normals for a given fixture design spans the force sphere, then all possible motions will violate at least one kinematic constraint.

Given a set of three contact normals corresponding to a locator set-up, the set of forces that would produce form closure can be directly constructed if a fourth contact normal is provided. This is accomplished by forming the convex combination of three contact normals in the force sphere and then centrally projecting this triangle onto the opposite side of this sphere. The resulting negated triangle delineates a set of all forces that will produce form closure. If a clamp position can be found with a contact normal that corresponds to a point in the negated triangle, then this clamp position and all of the three locators will define a form closure fixture. The set of clamp positions that satisfy this condition can be directly constructed by characterizing the set of all contact reaction forces that can be applied by a contact applied by the perimeter of the grown part.

Figure 9A:
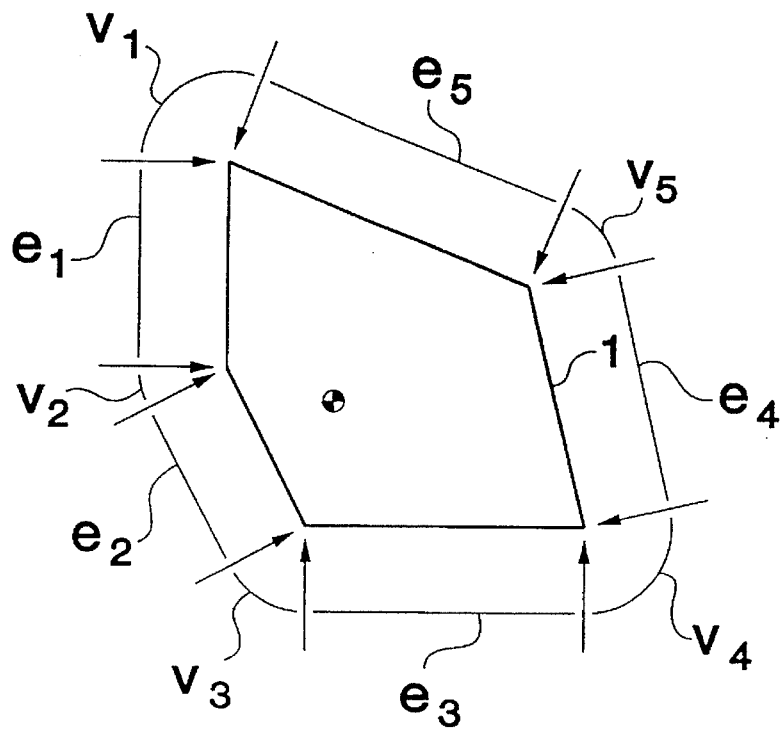
FIGS. 9(a) and 9(b) illustrate a "zig zag" locus of all forces that may be exerted by contacting a workpiece at a single point with the contact normals of FIG. 8(a) being shown for reference.
Figure 9B:
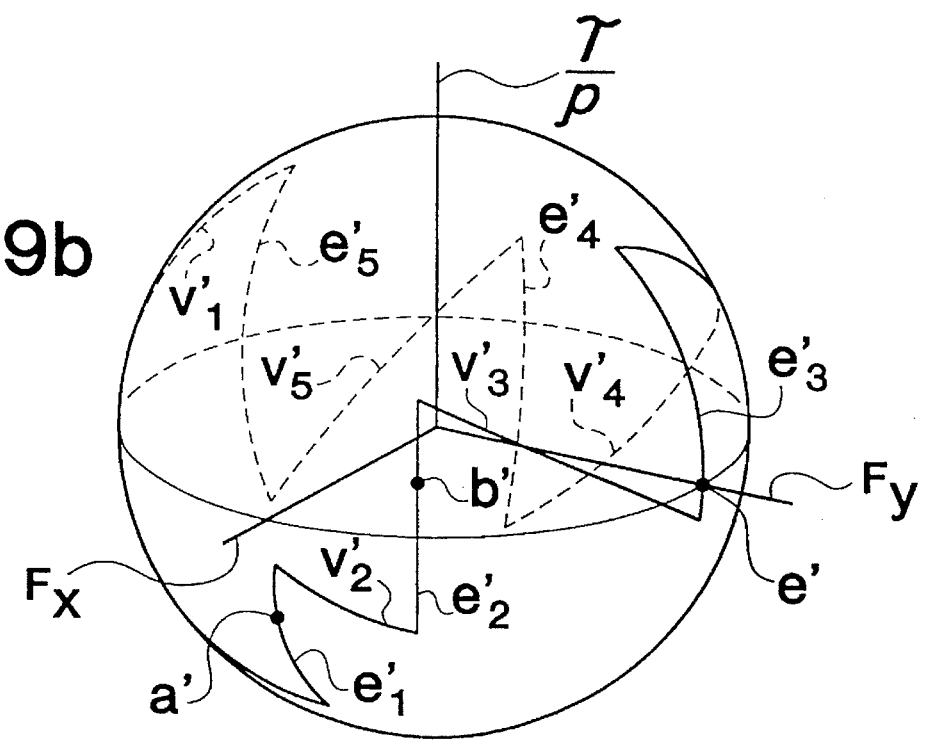
Figure 10A:
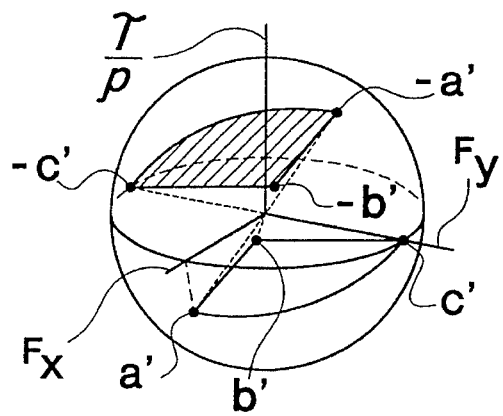
FIGS. 10(a), 10(b) and 10(c) and 10(d) illustrate generating a set of form closure clamp placements.
Figure 10B:
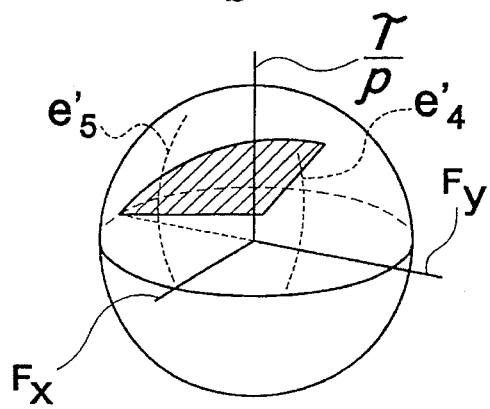
Figure 10C:
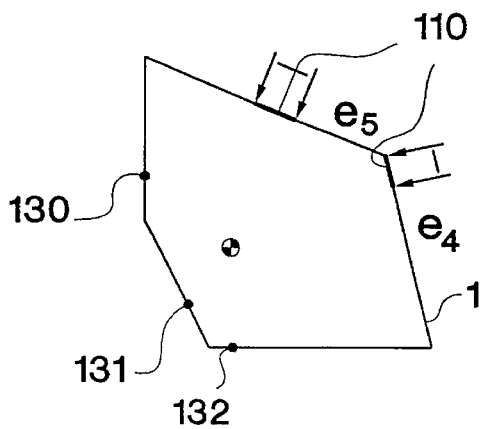
Figure 10D:
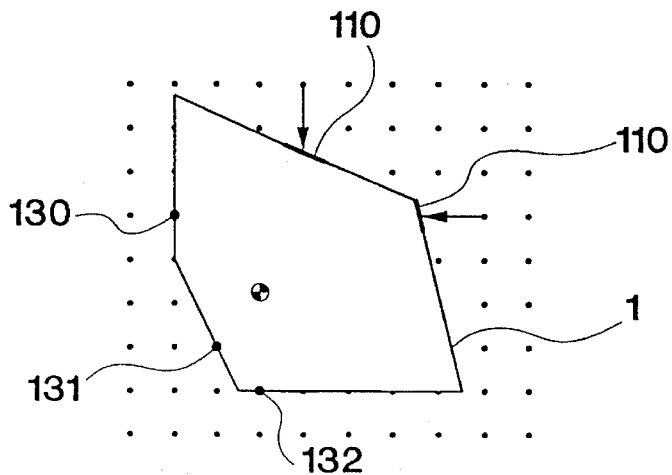

FIGS. 9(a) and 9(b) illustrate this set of forces. It is noted that the set of all possible contact forces corresponds to a "zig-zag" locus of points that encircles the force sphere as illustrated in FIG. 9(b). Fixel contacts along the edges of the polygon correspond to the vertical edges of the locus. As a force moves along an edge, it is noted that only the torque component of its wrench will vary. Fixel contacts with the vertices of the polygon correspond to the diagonal locus edges. By intersecting the vertical locus edges with a set of possible form closure forces previously constructed, this set of all available edge contact normals can be identified that produce form closure for a given locator set-up. The set of contact normals are then mapped back onto the grown part perimeter to identify the regions where a fourth contact-point will produce form closure at Step S90. Finally, the set of all possible clamp positions are identified by intersecting the identified regions with the horizontal and vertical edges of the array of holes as illustrated in FIGS. 10(a) through 10(d).

Next, the candidates are filtered through several geometric tests at Step S100 by checking clamp travel limits and clamp/workpiece and clamp/fixel interference for each clamp location. Fixtures are discarded where the translating clamp 110 intersects the workpiece with the locators 130, 131 and 132 or where the access constraints are met. Hereafter, the remaining fixtures are attempted to be fit on the array of holes 120 with fixtures that cannot be placed either horizontally or vertically being discarded in a simple bounding box check at Step S120. Fixtures that pass these tests are added to the fixture set at Step S130.

As seen in FIG. 3, the flow diagram proceeds so that each clamp location is considered at Step S140 and S150, each workpiece is considered at Steps S160 and S170 each third fixel is analyzed at Steps S180 and S190, each second fixel is analyzed at Step S200 and S210 and each edge triplet is generated at Steps S220. When all of the edge triplets are considered, the complete set of admissible fixture designs have been generated and this portion of the process ends.

After generating the complete set of admissible fixture designs, the admissible fixture designs are ranked according to a user supply called a scalar metric at Step S230. An automatically developed default quality metric may be used that favors fixtures which can resist expected applied forces without generating excessive contact reaction forces. Large contact forces are generally undesirable because they may deform the part. The effect of fixture designed geometry will be discussed with respect to FIGS. 11(a) and 11(b). If downward forces are to be applied to the workpiece 1, the fixture design in FIG. 11(b) is better than the fixture design and FIG. 11(b) because the fixture design of FIG. 11(b) develops large "wedging" forces between the fixels. On the other hand, if clockwise torques will be applied to the workpiece 1, then the fixture design of FIG. 11(b) is superior since the fixture design in FIG. 11(a) must develop large contact reaction forces to oppose rotation of the workpiece 1.

The default quality metric of this process allows the user to specify a variety of applied forces that are expected while the workpiece 1 is in the fixture. These forces are represented by a list of force sphere regions with associated magnitudes which allows the quality metric to simultaneously consider the effect of multiple operations such as machining, assembling, or pallet transferring operations. The quality metric scores each fixture by estimating the maximum contact reaction force required to resist any force of the expected applied forces. The ranking or the quality score is the negative of this force magnitude. The estimated maximum contact reaction force for a given fixture is calculated by considering each force sphere region in the applied force list, generating a discrete-sampling of points in a region, computing the maximum contact reaction force required to resist each point, scaling the result by the associated magnitude and taking the maximum of all the resulting contact reaction forces. At step S240, the optimal fixture determined by the ranking step is either manually or automatically located on the fixture plate.

Figure 4:
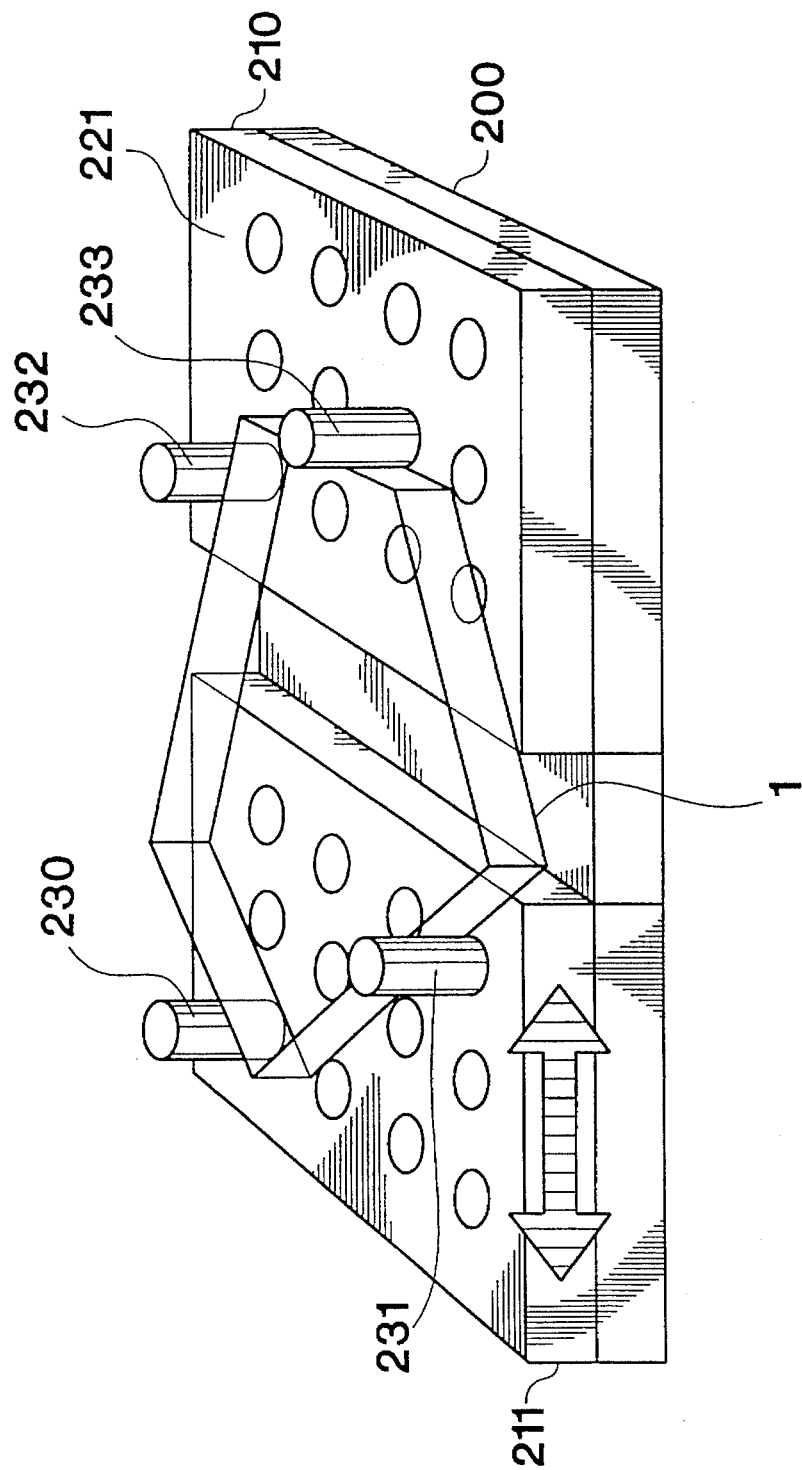
FIG. 4 illustrates a fixture vice system for another embodiment of the present invention.

A second embodiment of the present invention will now be discussed with respect to FIG. 4. FIG. 4 illustrates a fixture table 200, first and second fixture jaws 210 and 211 which each have an array of holes 221 and first, second, third and fourth locators 230, 231, 232, and 233. The first and second fixture vices 210 and 211 may be translated along the surface of the fixture plate 200 as illustrated by the arrow. For immobilizing a workpiece 1, in contact with the locators 230, 231, 232, and 233 by the use of this fixture vice in the second embodiment of the present invention, the pose of the workpiece 1 needs only to be roughly identified so that the specified edges of the workpiece 1 contact the locators 230, 231, 232, and 233 for immobilizing the workpiece 1.

The fixture processor 10 with the second embodiment operates similar to the process discussed in FIG. 3 with the exception being that a fourth locator 233 is used in place of a translating clamp. In the process for the second embodiment, a geometric representation of the workpiece 1 and the geometric constraints and expected applied forces for the workpiece 1 are input either manually or automatically. The fixture processor 10 then determines all of the possible configurations of the fixture device which hold/secure/fixture the workpiece 1 during operation and also satisfy the geometric constraints. After generating the admissible fixture design for the fixture device, the workpiece 1 needs only to be generally placed in the fixture device. Then, by closing and tightening the fixture device, the workpiece 1 will rotate into its stable position due to the quasistatic forces.

The set of admissible fixture designs is produced in an amount of time dependent upon the complexity of the workpiece. However, based on the ranking, many design fixtures may be produced with very similar quality scores. Thereby, a sub-set of the complete set of admissible fixture designs may still lead to a very high quality fixture design. The number of admissible fixture designs produced are primarily dependent upon the size of the workpiece with respect to the array of holes on the fixture plate or fixture vices. When the array of holes is coarse, fewer designs are produced which reduces the execution time period. As a result, a grid step parameter may be used in the quality metric which allows the amount of time to be reduced if a more coarse array of holes is input. Accordingly, a method of interactively producing fixture designs may be used by first inputting a coarse array of holes and then refining the resolution so that a quick fixture design is obtained in a short amount of time and then a subsequent refined fixture design may be obtained by a more refined resolution.

The fixture design processes have been discussed with respect to design fixtures for modular components but this process may also be used to design dedicated fixtures. Modular fixturing components are somewhat more expensive than dedicated tooling which makes dedicated tooling preferably in mass production environments where multiple copies of the fixture are used for a large number of cycles. In mass production situations, the fixture process could be used to produce fixture designs which are then fabricated with a plane tooling plate. Because the major costs of modular fixturing components is in the precisely machined fixture plate, cost effective fixture designs can be achieved in this manner. This approach also has the additional advantage that product type fixtures can be built from modular components for initial testing purposes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claim.

What is claimed:

1. A modular fixturing system for fixturing a workpiece, comprising:

a fixture plate including an array of holes separated by a predetermined spacing for placing first, second and third locators thereon;

a translating clamp attached to said fixture plate for contacting said workpiece between said first, second and third locators and said translating clamp; and a fixture processor for receiving a geometric representation of said workpiece and geometric access constraints of said workpiece, for receiving data on said array of holes of said fixture plate and said first, second, and third locators, and for generating a set of admissible fixture designs which define positions for said translating clamp and said first, second, and third locators and which provide form closure based on said geometric representation of said workpiece, said geometric access constraints of said workpiece, and said data on said array of holes of said fixture plate and said first, second, and third locators.

2. A modular fixturing system according to claim 1, wherein said fixture processor comprises:

input means for inputting said geometric representation of said workpiece;

triplet determining means for generating sets of said array of holes on said fixture plate for said first, second and third locators;

clamp enumerating means for generating positions of said translating clamp on said fixture plate corresponding to said sets of said array of holes which provide form closure within said geometric access constraints for said workpiece; and fixture filtering means for checking clamp locations and clamp travel limits of the translating clamp and determining whether each said set of said array of holes and a corresponding position of said translating clamp will fit on said fixture plate for obtaining said set of admissible fixture designs.

3. A modular fixturing system according to claim 1, wherein said fixture processor comprises ranking means for ranking said set of admissible fixture designs according to a predetermined quality metric for said workpiece.

4. A modular fixturing system according to claim 3, wherein said predetermined quality metric allows said set of admissible fixture designs to be ranked by estimating a maximum contact reaction force required to resist expected applied forces.

5. A modular fixture system according to claim 1, where said fixture processor further comprises mapping means for mapping said set of admissible fixture designs onto said fixture plate.

6. A modular fixturing system according to claim 1, wherein said fixture processor comprises a Symbolico SL-1201 Lisp machine.

7. A modular fixturing system according to claim 1, wherein said fixture processor generates said set of admissible fixtures based on said expected applied forces on said workpiece.

8. A modular fixturing system comprising:

a fixture plate including an array of holes for receiving first, second and third locators and a translating clamp attached thereto for contacting a workpiece; and a fixture processor for receiving a geometric representation of said workpiece and geometric access constraints of said workpiece, for receiving data on said array of holes of said fixture plate and said first, second, and third locators, and for generating a set of admissible fixture designs which define positions for said translating clamp and said first, second, and third locators and which provide form closure based on said geometric representation of said workpiece, said geometric access constraints of said workpiece, and said data on said array of holes of said fixture plate and said first, second, and third locators.

9. A modular fixture design processor for developing a set of admissible fixture designs on a fixture plate for a workpiece with first, second and third locators and a translating clamp, comprising:

input means for inputting a geometric representation of the workpiece;

triplet determining means for generating sets of the first, second and third locator positions on the fixture plate for the workpiece;

clamp enumerating means for generating positions of the translating clamp on the fixture plate corresponding to said sets of the first, second and third locator positions which provide form closure based on geometric access constraints; and fixture filtering means for checking clamp locations and clamp travel limits of the translation clamp and determining whether said sets of the first, second and third locator positions and the corresponding positions of the translating clamp will fit on the fixture plate so that the set of admissible fixture designs is obtained.

10. A modular fixture design processor according to claim 9, further comprising ranking means for ranking the set of admissible fixture designs according to a predetermined quality metric for the workpiece.

11. A modular fixture design processor according to claim 10, wherein said predetermined quality metric allows the set of admissible fixture designs to be ranked by estimating a maximum contact reaction force required to resist expected applied forces within said geometric access constraints.

12. A modular fixture design processor according to claim 9, wherein said clamp enumerating means generates said positions of said translating clamp based on said expected applied forces on said workpiece.

13. A modular fixture design processor for developing a set of admissible fixture designs on a fixture plate for a workpiece with first, second and third locators and a translating clamp comprising:

input means for inputting a geometric representation of the workpiece including geometric access constraints; and generating means for generating the set of admissible fixture designs for said geometric representation of the workpiece which define positions for said translating clamp and said first, second, and third locator and which provides form closure based on said geometric access constraints of the workpiece.

14. A method for developing a set of admissible fixture designs on a fixture plate for a workpiece with first, second and third locators and a translating clamp, comprising the steps of:

(a) inputting a geometric representation of the workpiece including geometric access constraints;

(b) generating sets of the first, second and third locator positions on the fixture plate for the workpiece;

(c) generating positions of the translating clamp on the fixture plate corresponding to said sets of the first, second and third locator positions which provide form closure based on said geometric access constraints of the workpiece on the fixture plate;

(d) checking clamp locations and clamp travel limits of the translating clamp; and (e) determining whether said sets of the first, second and third locator positions and the corresponding positions of the translating clamp generated at said steps (b) and (c) will fit on the fixture plate for obtaining the set of admissible fixture designs.

15. A method for developing a set of admissible fixture designs according to claim 14, further comprising the step of ranking the set of admissible fixture designs according to a predetermined quality metric for the workpiece.

16. A method for developing a set of admissible fixture designs according to claim 15, wherein said predetermined quality metric allows the set of admissible fixture designs to be ranked by estimating a maximum contact reaction force required to resist expected applied forces within said geometric access constraints.

17. A method for developing a set of admissible fixture designs according to claim 14, further comprising the step of mapping the set of admissible fixture designs onto the fixture plate.

18. A method for developing a set of admissible fixture designs according to claim 14, further comprising the step of locating one of said sets of the first, second and third locator positions and the corresponding position of the translating clamp on the fixture plate.

19. A method for developing a set of admissible fixture designs according to claim 14, wherein step (c) generates positions of said translating clamp based on expected applied forces on said workpiece.

20. A method for developing a set of admissible fixture designs on a fixture plate for a workpiece with first, second and third locators and a translating clamp, comprising the steps of:

(a) developing a geometric representation of the workpiece;

(b) inputting geometric access constraints of the workpiece; and (c) generating the set of admissible fixture designs for said geometric representation of the workpiece which defines positions for said translating claim and said first, second, and third locators and which provides form closure based on said geometric access constraints of the workpiece inputted at said step (b).

21. A method for developing a set of admissible fixture designs according to claim 20, further comprising the step of locating one of said sets of the first, second and third locator position and the corresponding position of the translating clamp on the fixture plate.

22. A method for developing a set of admissible fixture designs according to claim 20, wherein step (b) inputs said geometric access constraints and expected applied forces on said workpiece; and step (c) generates said set of admissible fixture designs based on said expected applied forces.

23. A modular fixture system comprising:

a fixture vice;

first and second fixture jaws disposed on said fixture vice capable of being translated in a planar direction along a top surface of said fixture vice and being immobilized at a desired position, said first and second fixture jaws including an array of holes separated by a predetermined distance for placing first, second, third and fourth locators therein which contact a workpiece; and a fixture processor for receiving a geometric representation of said workpiece and geometric access constraints of said workpiece, for receiving data on said array of holes of said first and second fixture jaws, and for generating a set of admissible fixture designs which define positions for said first, second, third, and fourth locators on said first and second fixture jaws and which provide form closure based on said geometric representation of said workpiece, said geometric access constraints of said workpiece and said data on said array of holes of said first and second fixture jaws.

24. A modular fixturing system according to claim 23, wherein said fixture processor comprises:

input means for inputting a geometric representation of said workpiece including said geometric access constraints;

triplet determining means for generating sets of said array of holes on said first fixture jaw for said first, second and third locators;

jaw enumerating means for generating positions of said fourth locator on said second fixture jaw corresponding to said sets of said array of holes which provide form closure within said geometric access constraints for said workpiece; and fixture filtering means for checking fourth locator positions and second fixture jaw travel limits and determining whether each said set of said array of holes and a corresponding position of said fourth locator will fit on said fixture vice for obtaining said set of admissible fixture designs.

25. A modular fixturing system according to claim 23, wherein said fixture processor comprises ranking means for ranking said set of admissible fixture designs according to a predetermined quality metric for said workpiece.

26. A modular fixturing system according to claim 25, wherein said predetermined quality metric allows said set of admissible fixture designs to be ranked by estimating a maximum contact reaction force required to resist expected applied forces.

27. A modular fixture system according to claim 23, where said fixture processor further comprises mapping means for mapping said set of admissible fixture designs onto said fixture vice.

28. A modular fixturing system according to claim 23, wherein said fixture processor comprises a Symbolico SL-1201 Lisp machine.

29. A fixturing system comprising:

a fixture plate including an array of holes for receiving a plurality of locators and translating clamp for contacting a workpiece; and a fixture processor for receiving a geometric representation of said workpiece and geometric access constraints of said workpiece, for receiving data on said array of holes of said fixture plate and said first, second, and third locators, and for generating a set of admissible fixture designs which define positions for said translating clamp and said first, second, and third locators and which provide form closure based on said geometric representation of said workpiece, said geometric access constraints of said workpiece, and said data on said array of holes of said fixture plate and said first, second, and third locators.

30. A fixturing system according to claim 29, wherein said plurality of locators comprises first, second and third locators.

31. A fixturing system according to claim 29, wherein said set of admissible fixture designs is generated corresponding to a desired type of fixture.

32. A fixturing system according to claim 31, wherein said desired type of fixture is one of a form-closure fixture, a force-closure fixture, a simple-locating fixture and a redundantly-constrained fixture.

33. A fixturing system according to claim 29, wherein said fixture processor generates said set of admissible fixture designs based on expected applied forces on said workpiece.

34. A modular fixture design processor for developing a set of admissible fixture designs on a fixture vice for a workpiece with first and second fixture jaws disposed on said fixture vice capable of being translated in a planar direction along a top surface of said fixture vice and being immobilized at a desired position, said first and second fixture jaws including an array of holes separated by a predetermined distance for placing first, second, third and fourth locators therein which contact said workpiece, comprising:

input means for inputting a geometric representation of the workpiece including geometric access constraints;

triplet determining means for generating sets of the first, second and third locator positions on said first fixture jaw for the workpiece; and jaw enumerating means for generating a fourth locator position on said second fixture jaw corresponding to said sets of the first, second and third locator positions which provide form closure based on said geometric access constraints of the workpiece.

35. A modular fixturing system according to claim 34, wherein said fixture processor generates said set of admissible fixtures based on said geometric access constraints and expected applied forces on said workpiece.

36. A method for developing a set of admissible fixture designs on a fixture vice for a workpiece with first and second fixture jaws disposed on said fixture vice capable of being translated in a planar direction along a top surface of said fixture vice and being immobilized at a desired position, said first and second fixture jaws including an array of holes separated by a predetermined distance for placing first, second, third and fourth locators therein which contact said workpiece, comprising the steps of:

(a) inputting a geometric representation of the workpiece including geometric access constraints;

(b) generating sets of the first, second and third locator positions on said first fixture jaw for the workpiece; and (c) generating positions of the fourth locator on said second fixture jaw corresponding to said sets of the first, second and third locator positions which provide form closure based on said geometric access constraints of the workpiece.

37. A method for developing a set of admissible fixture designs according to claim 36, further comprising:

(d) checking fourth locator positions and second fixture jaw travel limits; and (e) determining whether said sets of the first, second and third locator positions and the corresponding positions of the fourth locator generated at said steps (b) and (c) will fit on the fixture vice for obtaining the set of admissible fixture designs.

38. A method for developing a set of admissible fixture designs according to claim 36, further comprising the step of ranking the set of admissible fixture designs according to a predetermined quality metric for the workpiece.

39. A method for developing a set of admissible fixture designs according to claim 38, wherein said predetermined quality metric allows the set of admissible fixture designs to be ranked by estimating a maximum contact reaction force required to resist expected applied forces within said geometric access constraints.

40. A method for developing a set of admissible fixture designs according to claim 36, further comprising the step of mapping the set of admissible fixture designs onto the fixture vice.

41. A method for developing a set of admissible fixture designs according to claim 36, further comprising the step of locating one of said sets of the first, second and third locator positions and the corresponding position of the fourth locator on the fixture vice.

42. A method for developing a set of admissible fixture designs according to claim 36, wherein step (c) generates positions of said fourth locator based on said geometric access constraints and expected applied forces on said workpiece.

* * * * *